Fig.1.

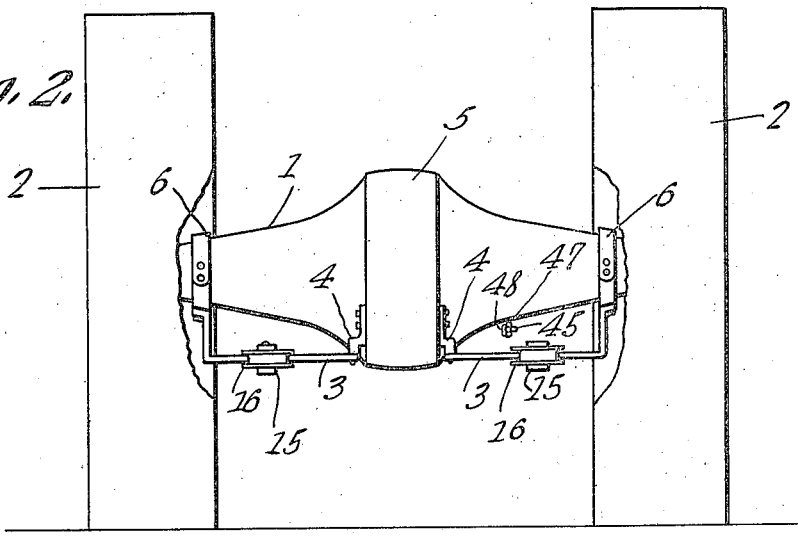
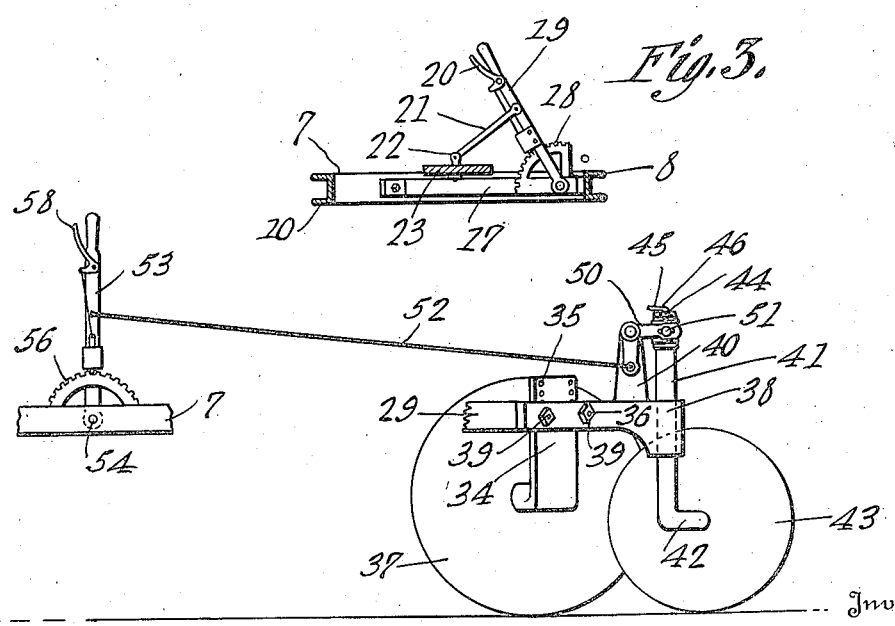

Patented Dec. 11, 1923.                                                            1,476,738

UNITED STATES PATENT OFFICE.

JOSEPH HERSCHEL TAYLOR, OF BENTON, TENNESSEE.

TRACTOR PLOW.

Application filed August 11, 1921. Serial No. 491,621.

*To all whom it may concern:*

Be it known that I, JOSEPH HERSCHEL TAYLOR, a citizen of the United States, residing at Benton, in the county of Polk and State of Tennessee, have invented a new and useful Tractor Plow, of which the following is a specification.

The device forming the subject matter of this application is a tractor plow and the invention aims to provide, in a device of the class described, a strong and heavy frame which may be attached readily to the axle of a tractor and be kept directly in line with the tractor, regardless of whether the tractor is moving on a straight line or is turning a curve, the frame being closely associated with the tractor, so that the point of application will not be too remote from the point of resistance. Another object of the invention is to provide novel means for shifting the frame transversely of the draft line, so as to adjust the soil engaging elements with respect to the soil. Another object of the invention is to provide novel means for shifting the position of the castor wheel. Another object of the invention is to provide novel means for adjusting the position of the castor wheel to aid in steering the device.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1:
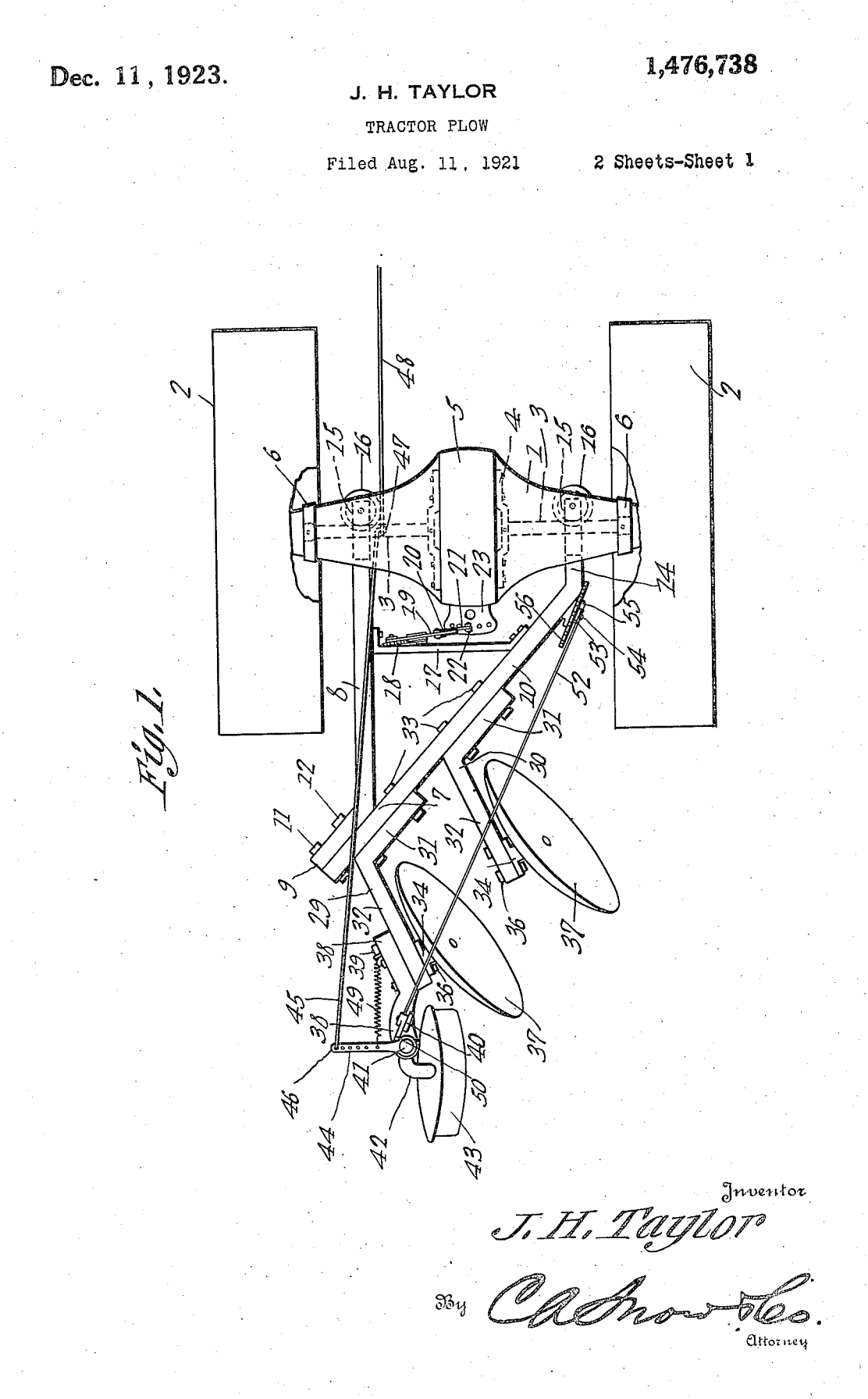

Figure 1 shows in top plan, a device constructed in accordance with the invention; Figure 2 is a rear elevation, parts being broken away; Figure 3 is a fragmental sectional view; and Figure 4 is a fragmental elevation.

The numeral 1 marks a support, as the rear axle casing of a tractor, the ground wheels being designated by the numeral 2 and the numeral 5 denoting the differential housing, which forms part of the rear axle casing 1. A track is disposed parallel to the axle casing 1 and is located beneath the same. The track may be constructed and mounted in various ways. If desired, the track may embody members 3 in the form of bars, the inner ends of the members 3 being carried by brackets 4 connected to the differential housing 5. The tracks 3 are connected at their outer ends, by means of clamps 6, with the axle casing 1.

The device embodies a frame, denoted generally by the numeral 7, the frame including a main bar 8 disposed parallel to the draft line and having an outwardly extended foot 9. The frame 7 includes an auxiliary bar 10, disposed at an angle to the draft line, the rear end of the bar 10 being attached to the foot 9 of the main bar 8 through the instrumentality of securing elements 11 and 12. The forward end 14 of the auxiliary bar 10 is disposed parallel to the main bar 8. The end 14 of the bar 10 and the corresponding end of the bar 8 have bifurcations 15 receiving the track members 3, the said bifurcations carrying anti-friction elements 16, such as grooved wheels, the wheels being adapted to traverse the members 3 of the track, and the construction being such that the frame 7 may be shifted transversely of the draft line.

A means under the control of an operator is provided, whereby the frame 7 may be shifted transversely of the draft line, and with this end in view, the frame 7 embodies a brace 17 extended between the bars 8 and 10, the brace carrying a segment 18 whereon a lever 19 is fulcrumed, the lever being provided with a latch mechanism 20 adapted to cooperate with the segment. A link 21 is pivoted at one end to the lever 19, the opposite end of the link being adjustably pivoted, as indicated at 22, to the ordinary lip 23 which extends from the housing 5.

Brackets 29 and 30 are provided, each bracket comprising arms 31 and 32 disposed at an angle to each other. The brackets 29 and 30 may be mounted at any desired points along the auxiliary bar 10 of the frame 7, the arms 31 of the brackets abutting against the bar 10 and being held thereon by the securing element 12 and by any desired number of securing elements 33. The arms 32 of the brackets project rearwardly from the bar 10. Hangers 34 depend from the arms 32 of the brackets 29 and 30 and are provided with a plurality of openings 35 adapted to receive securing elements 36 whereby the hangers are secured to the arms 32 of the brackets for vertical adjustment. Soil-engaging elements 37 of any desired sort are carried by the hangers 34. If desired, the soil-engaging elements 37 may be in the form or disks, although this detail is not insisted upon, the soil-engaging elements being disposed acutely with respect to the draft line, as shown in Figure 1.

A bearing member 38 is secured at 39 to the arm 32 of the bracket 29 and has an upstanding arm 40. A vertical shaft 41 is mounted for rocking movement in the bearing member 38 and carries an inwardly offset axle 42 whereon a castor wheel 43 is journaled. The shaft 41 has an outwardly extended arm 44 whereunto a steering element 45 is adjustably pivoted at 46, the steering member 45 being hinged or pivoted at 47 to a rod 48 or the like, constituting a part of the steering mechanism of the tractor. Obviously, through the instrumentality of the rod 48 and the member 45, together with the arm 44, the shaft 41 may be rocked in the bearing member 38 and, thus, the castor wheel 43 may be disposed at any desired angle with respect to the furrow, and at any desired angle with respect to the line of advance, thereby to aid in steering the vehicle. The castor wheel 43 is steadied through the instrumentality of a retractile spring 49, one end of which is connected to the arm 44, the other of which is connected to the bearing member 38. The castor wheel 43 may be raised and lowered, at the will of an operator. Any desired means for accomplishing this result may be provided. If preferred, the shaft 41 may have a vertical movement in the bearing member 38. A bell crank lever 50 is fulcrumed on the arm 40 of the member 38 and is loosely pivoted, at its upper end, as shown at 51, to the upper end of the shaft 41. To the lower end of the depending arm of the bell crank lever 50, a connection or rod 52 is pivoted. The rod 52 is pivotally connected with the intermediate portion of a lever 53 fulcrumed at 54 on the bar 10 or elsewhere, the lever carrying a latch mechanism 55 adapted to cooperate with a fixed segment 56 on the frame of the machine.

Obviously, through the instrumentality of the lever 19, the frame 7 and the soil-engaging elements 37, whatever be their form, may be adjusted transversely of the draft line. The castor wheel 43 may be shifted through the instrumentality of the rod 48 and coacting parts, the lever 53 and elements associated therewith constituting means whereby the castor wheel 43 may be raised or lowered.

Having thus described the invention, what is claimed is:

In a device of the class described, a wheel mounted support, a straight track carried by the support and disposed at right angles to the draft line, a frame comprising a main bar disposed parallel to the draft line, an auxiliary bar connected at its rear end to the main bar and located at an angle to the draft line, and a brace connecting the bars, the forward ends of the bars being mounted on the track for vertical swinging movement and for sliding movement thereon transversely of the draft line, adjustable means connecting the brace and the support to shift the frame transversely of the draft line, and a bracket extended rearwardly from the auxiliary bar, and a soil-engaging member carried by the bracket.

JOSEPH HERSCHEL TAYLOR.